United States Patent [19]
Traina et al.

[11] Patent Number: 5,535,634
[45] Date of Patent: Jul. 16, 1996

[54] ENHANCED TYPE S PITOT TUBE WITH REDUCED AND SYMMETRIC RESPONSE TO PITCH

[75] Inventors: John E. Traina, Glenshaw; Richard Myers, Gibsonia, both of Pa.

[73] Assignee: United Sciences, Inc., Gibsonia, Pa.

[21] Appl. No.: 395,421

[22] Filed: Feb. 28, 1995

[51] Int. Cl.⁶ .................................................... G01F 1/46
[52] U.S. Cl. ............................................................. 73/861.65
[58] Field of Search ........................... 73/861.65, 861.66, 73/861.67

[56] References Cited

U.S. PATENT DOCUMENTS

| | | | |
|---|---|---|---|
| 2,706,409 | 4/1955 | Preston | 73/861.67 |
| 3,997,249 | 8/1976 | Wittig | 73/212 |
| 4,559,836 | 12/1985 | Coleman et al. | 73/861.66 |
| 4,754,651 | 7/1988 | Shortridge et al. | 73/861.65 |
| 4,957,007 | 9/1990 | Gray | 73/861.65 |
| 5,036,711 | 8/1991 | Good | 73/861.66 |

FOREIGN PATENT DOCUMENTS 2231667  11/1990  United Kingdom .

OTHER PUBLICATIONS

Technisches Messen Tm, Vol. 48, No. 6, Jun. 1981, Munchen De, pp. 229–232, J. Wachter, E. A., "Automatischer Nullabgleich For Stromungssonden".

Appendix A, Methods 1 and 2 of 40 Code of Federal Regulations, Part 60, Jul. 1, 1992.

Primary Examiner—Kenneth A. Wieder
Assistant Examiner—Max Noori

[57] ABSTRACT

A improved Type S or reverse type pitot tube has two conduit legs which are mirror images of one another. Each conduit leg has an input portion having a pressure port therein, a support portion and a connecting portion connected between the input portion and the support portion. The support portion and the connecting portion lie in one plane which plane is substantially perpendicular to a centerline through the input portions. The conduit legs are shaped and oriented relative to one another so that the pressure ports of the input portions of the first and second conduits are collinear and when placed in a conduit, the pitot tube will be symmetrical in a yaw plane and both symmetrical and non-interfering in a pitch plane. The first and second conduits are spaced apart over at least a portion of their length to define an opening adjacent the input portions which opening is at least 3 times wider and deeper than the input portions. With this pitot tube the errors in flow measurement which result from the pitch angle flow are negligible in most cases and never result in a low biased reading.

14 Claims, 9 Drawing Sheets

ENHANCED TYPE S PITOT TUBE WITH REDUCED AND SYMMETRIC RESPONSE TO PITCH

FIELD OF INVENTION

The invention relates to pitot tubes which are used for measuring the direction and flow rate of a fluid through a conduit, and particularly the Type S or reverse type pitot tube which is useful for emissions monitoring.

BACKGROUND OF THE INVENTION

There are many situations in which there is a need or desire to measure the rate of flow of a liquid or gas through a conduit. The federal government of the United States has set limits as to the amount of pollutants that an electric utility or other business may emit into the air. Typically, these emissions are determined from measurements of the flow rate of the stack gasses through the stack and an analysis of the stack gasses to determine the levels of pollutants which are present. Appendix A, Methods 1 and 2 of Title 40 of the United States Code of Federal Regulations, Part 60, sets forth approved methods for monitoring stack gas flow.

The measurement of flow velocity in ducts and stacks has traditionally been done using a device known as the "Type S", or "reverse-type" pitot tube. The design and calibration procedures relevant to the device have been published as ASTM Standard D-3796-90, and are essentially replicated in Method 2 of Appendix A of Title 40 of the United States Code of Federal Regulations, Part 60. FIG. 1 illustrates a typical Type S pitot tube which is well known in the art.

Essentially, the Type S pitot tube measures velocity via the differential pressure $\Delta P$ between the impact pressure produced in the open end of Leg A (the tube that faces into the flow) and the venturi vacuum produced on Leg B (the tube that faces away from the flow) when the probe is aligned with the nominal flow direction. This relationship is given by:

$$V_{nom} = (85.49 \, ft/sec) C_p (\Delta p)^{0.5} [T_s/(P_s M_s)]^{0.5}$$

where:

$V_{nom}$ is the velocity calculated from measurements with the Type S pitot tube aligned with leg A facing into the nominal flow direction $C_p$ is the dimensionless pitot tube coefficient (nominally 0.84)

$\Delta P$ is the delta-pressure across the pitot tube in inches of water $T_s$ is the absolute temperature of the stack in degrees Rankin $P_s$ is the absolute static pressure of the stack in inches of mercury $M_s$ is the molecular weight of the stack gases The calibration coefficient $C_p$ is determined via comparison with a device known as a Standard Pitot Tube, which is illustrated as FIG. 2. The standard pitot tube essentially develops its differential pressure $\Delta P_{std}$ as the difference between the impact pressure on a small hole on the upstream hemispherical boss and the stagnation pressure average across a set of small holes oriented perpendicularly to the flow. Because the Type S tube measures its impact pressure with a larger opening, and because the impact pressure is referenced to a venturi-created vacuum rather than to a stagnation pressure, the Type S tube creates a larger $\Delta P_{nom}$ than $\Delta P_{std}$, thereby making possible the measurement of lower velocities. For this reason, and also because the larger openings in the Type S are much less susceptible to clogging, use of the Type S pitot tube has been the method of choice as a referenced method of measuring flow in dirty and/or corrosive applications.

Limitations with the prior design of the Type S pitot tube include systematic calibration bias in the presence of non-axial flow. In normal use, the Type S pitot tube is aligned with the nominal flow direction. The delta pressure associated with this orientation, $\Delta P_{nom}$, is determined, and Equation 1 is used to calculate the gas velocity, $V_{nom}$, associated with this orientation. What is desired, however, is the actual axial velocity vector, $V_{axial}$, along the nominal flow direction. This is the measurement that, averaged across the stack or duct and multiplied by the cross-sectional area, will yield the actual volumetric flow.

In practice, the flow pattern is seldom axial. Non-axial flow is usually described via two parameters: "yaw angle" and "pitch angle". Both the pitch and yaw angles are measured from a line passing through the traverse point and parallel to the stack axis. The pitch angle is the angle of the gas flow component in the plane that includes the traverse line and is parallel to the nominal flow direction. By convention, the pitch angle P is defined as positive when the flow is tilted toward the probe assembly, i.e. toward the stack wall through which the probe has been inserted (See FIG. 7). The pitch angle P is defined as negative when the flow is tilted away from the probe assembly, which direction is also away from the stack wall through which the probe has been inserted. The yaw angle is defined as positive when the flow is tilted in a direction clockwise from the nominal flow direction about a line transverse to the nominal flow direction or the line of sight looking from the test port. The yaw angle is defined as negative when the flow is tilted in a direction counterclockwise from the nominal flow direction about that same line.

Since it is the goal, in using a pitot tube, to calculate:

$$V_{axial} = V_{actual} (\cos Y)(\cos P),$$

where $V_{actual}$ is the flow velocity along the actual direction of flow, it follows that the ideal response of a Type S pitot tube would be:

$$V_{nom} = V_{ideal} = V_{actual} [(\cos Y)(\cos P)]^{-1}$$

FIG. 3 shows the percent difference between $V_{nom}$ and $V_{ideal}$ over a $\pm 60°$ range of pitch and yaw angles. It is apparent that the Type S pitot tube, aligned in the nominal flow direction, will be seriously in error in the presence of nonaxial flow.

It can also be noted that the error associated with using the Type S pitot in this manner is symmetric and always positive for both positive and negative yaw angles. This penalizes users who are using the pitot tube to monitor flow for the purpose of calculating pollution emissions, but is of less concern to regulatory bodies who are more concerned that the measurement never result in an understatement of emissions. It is the policy of regulatory enforcers to eliminate negative sources of bias in emissions measurements and, indeed, the EPA is considering restricting the use of the Type S pitot tube to applications in which negative bias cannot occur.

In our paper "Fully Automated Probe Performs EPA Methods 1 and 2 for Volumetric Flow: Recent Field Experiments and Technical Enhancements", presented at the Acid Rain & Electric Utilities: Permits, Allowances. Monitoring & Meteorology Symposium on Jan. 23–25, 1995, in Tempe, Ariz., we describe a method and an automated apparatus whereby the yaw angle of the flow can be accurately measured via a Type S pitot tube which is substantially rotated into alignment with the actual yaw angle and the axial component of the flow calculated via trigonometric correction for the yaw angle. This methodology effectively eliminates errors attributable to yaw-angle flow. In circular stacks, where the yaw angle of the flow is typically more significant than is the pitch angle, this removes most of the measurement error. This method is also the subject of pending U.S. patent application Ser. No. 08/315,558 filed Sep. 30, 1994.

Examining FIG. 3 again, it is noteworthy that the error associated with pitch-angle flow is non-symmetric, being positive for positive pitch and negative for negative pitch. This is due to nonsymmetric aerodynamic interference from the support tubing. The phenomenon is of great concern to regulatory agencies who wish to eliminate all sources of negative bias. The nulling techniques which we use to handle yaw angle flow cannot be used to compensate for pitch angle where flow is being measured using a Type S pitot tube such as is shown in FIG. 1. The pitch angle flow component is at an angle toward or away from the test port. Because of the shape and construction of the Type S pitot tube it is not possible to rotate the Type S pitot tube around an axis transverse to the pitch flow direction.

It is also not practical to mathematically compensate for the pitch angle component by measuring the pitch angle using some other technique, because the type of equipment required for this is complex and not suitable for operation in many environments.

Consequently, there is a need for a more reliable and more accurate reverse type pitot tube for measuring true flow rate of a fluid through a conduit in which the effect of the pitch angle is reduced and in which negative bias is eliminated.

We have discovered that if the interference in the pitch plane is removed and if the geometry of the pitot tube in the pitch plane is symmetrical, the errors which result from the pitch angle flow are negligible in most cases and never result in a low biased reading. Our device therefore meets the goals of the regulatory agencies who desire or require that a monitoring device never give a low reading.

SUMMARY OF THE INVENTION

Our improved Type S or reverse type pitot tube has two conduit legs which are mirror images of one another. Each conduit leg has an input portion having a pressure port therein, a support portion and a connecting portion between the input portion and the support portion. The support portion and the connecting portion lie in one plane which plane is substantially perpendicular to a centerline through the input portions. The conduit legs are shaped and oriented relative to one another so that the pressure ports of the input portions of the first and second conduits are collinear and when placed in a conduit, the pitot tube will be symmetrical in a yaw plane and both symmetrical and non-interfering in a pitch plane. The first and second conduits are spaced apart over at least a portion of their length to define an opening adjacent the input portions which opening is at least 3 times wider and deeper than the input portions.

We prefer to provide an input assembly containing the pressure ports and the input portions of the conduit legs.

DESCRIPTION OF THE PREFERRED EMBODIMENTS

Figure 1:
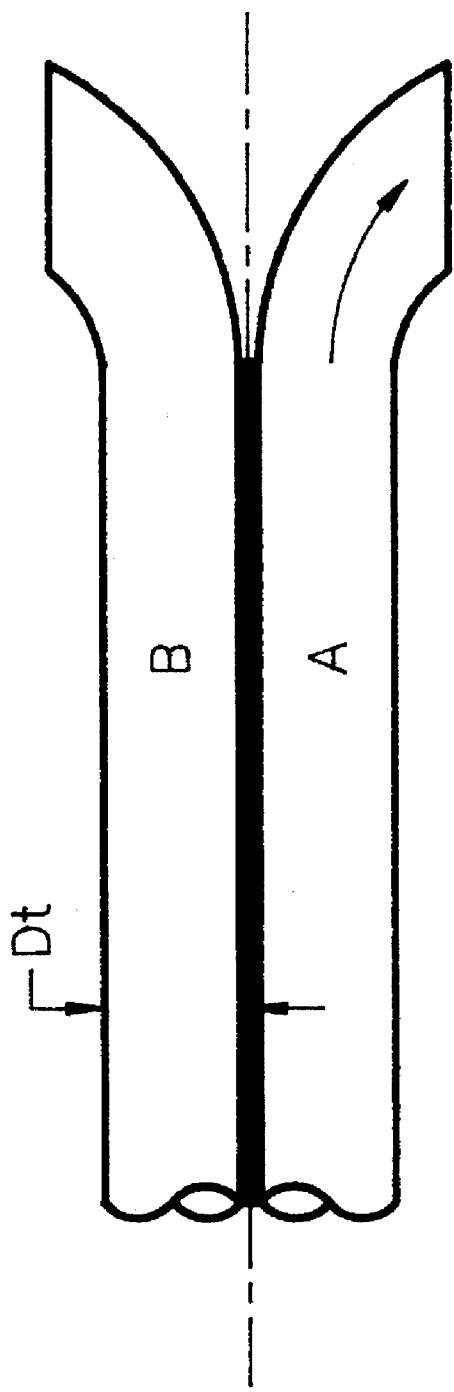
FIG. 1 is a side view of a prior art Type S pitot tube.
Figure 2:
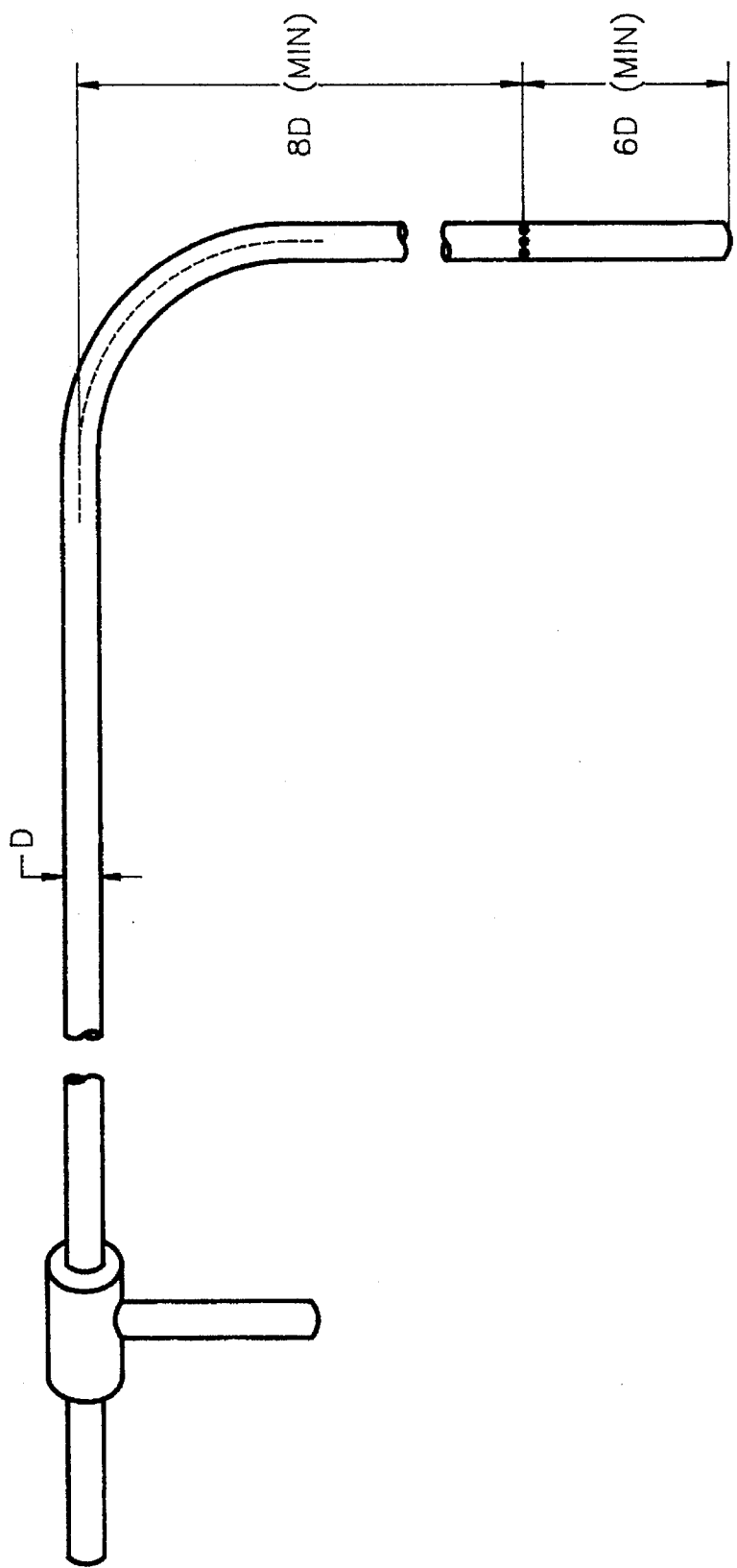
FIG. 2 is a side view of a prior art standard pitot tube.

As shown in FIGS. 4 thru 7 our pitot tube 10 is comprised of two conduit legs 12 and 14. The legs pass through a connecting plate 16 which assures that they maintain the orientation and relative position shown in FIG. 4. Connectors 18 and 20 are provided on the proximate ends of tubes 12 and 14, respectively, to permit the pitot tube to be connected to the main conduit of the probe assembly 30 shown in FIG. 7. Each of the legs 12 and 14 have a generally straight support portion 13, 15 which extends from the plate 16 to a central connecting portion 17, 19 which is preferably a smoothly curved portion such as the generally U-shaped sections in the embodiment shown in FIGS. 4 thru 7. From the connectors 18 and 20 to the U-shaped portions 17 and 19 conduits 12 and 14 lie the same plane. At the end of the U-shaped portions 17 and 19 the conduit legs are attached to a symmetrical input assembly 26. Two conduits 22 and 24 each having pressure ports 28 and 29 are provided in the input assembly 26. Conduits 22 and 24 are configured so that the pressure ports 28 and 29 are collinear on a line A—A which is normal to the plane in which conduit legs 12 and 14 lie. We prefer that the outside of the input assembly 26 be shaped so that its diameter gradually increases from a point spaced a selected distance from the open tips 23, 25 of the assembly toward the center of the assembly 26. As can be seen clearly in FIGS. 5 and 6, this provides a symmetric configuration to the pitot tube and minimizes aerodynamic interferences in the pitch plane. We also prefer to provide a temperature probe (not shown) that extends through the connector plate 16 toward the input assembly, but not so far as to present aerodynamic interference.

Figure 8:
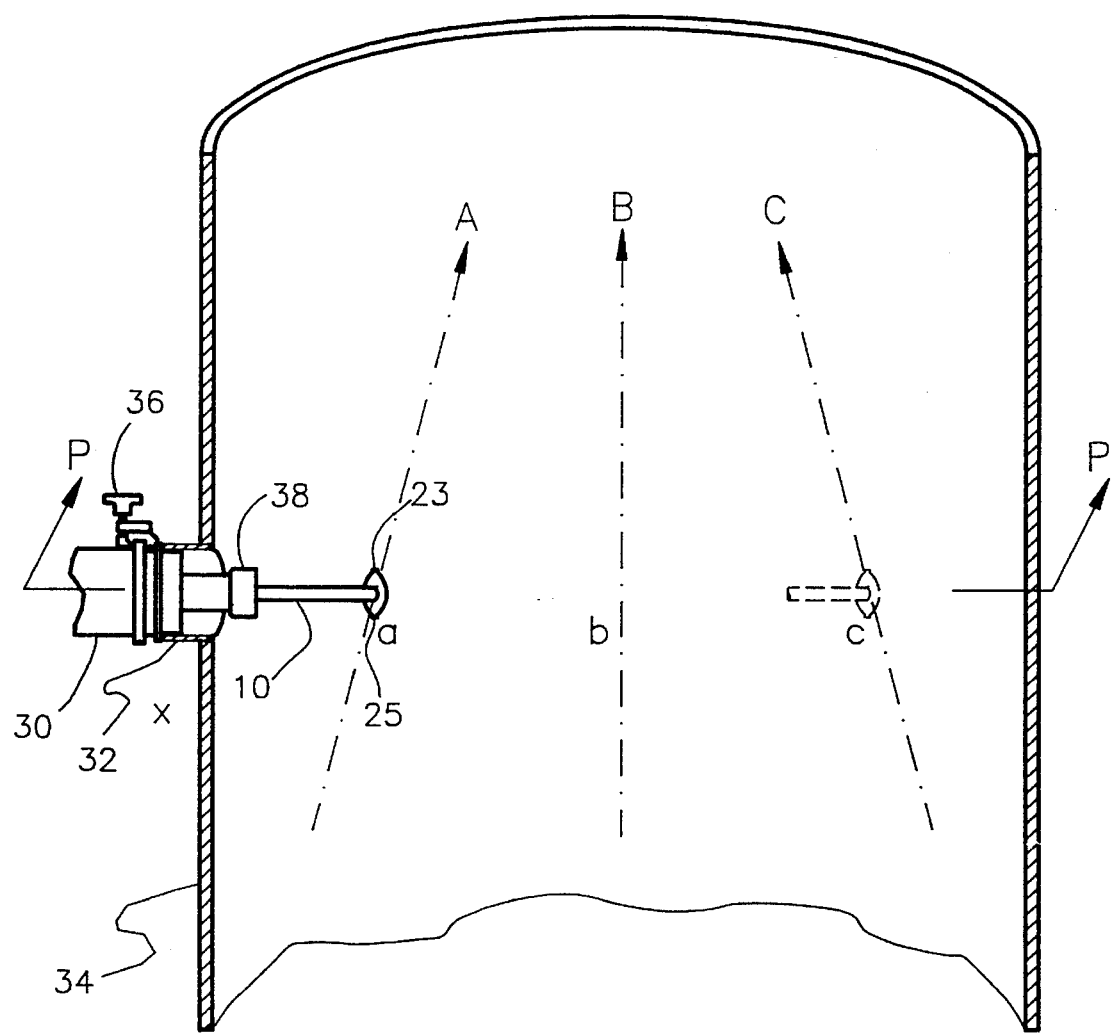
FIG. 8 is a diagram illustrating a present preferred embodiment of our reverse type pitot tube having enhanced symmetry positioned in a stack.

Use and advantages of our pitot tube can best be understood in the context of a sampling probe which utilizes our pitot tube. Such a sampling probe positioned in a smokestack is illustrated in the diagram of FIG. 8. The probe assembly 30 is mounted to a port 32 in a stack 34 in which emissions monitoring is performed. The probe assembly is held on the stack 34 by a clamp 36 which attaches the probe assembly to the stack. The pitot tube 10 is attached to the distal end of a conduit which has separate tubes or pipes therein that or connected to each leg 12 and 14 of the pitot tube 10. The probe assembly is designed so that the conduit 38 and attached pitot tube 10 can be rotated, advanced and retracted within the conduit. Usually, the pitot tube will be initially oriented to be aligned with a line parallel to a centerline through the conduit. That centerline corresponds to vector B in FIG. 8. For present purposes and in accordance with the practice in the art, vector B is considered the nominal flow direction. Assume that the test method requires readings to be taken at points a, b and c where vectors A, B and C pass through plane P. At any given point the true flow direction will have three components, a vertical component, a yaw component and a pitch component. The vertical component is parallel to a centerline through the conduit and corresponds to positive movement along the y axis in the diagram of FIG. 8. The pitch component is movement in a direction forward or away from a person looking through the port. This direction is represented by the x axis in FIG. 8. The yaw component is movement in a direction left or right relative to a person looking into the stack from the port. This direction would be represented by a z axis not shown in the drawing.

In FIG. 8 we show our pitot tube at point a. The device could also be positioned at point c as indicated in chain line. At point a the direction of flow is indicated by vector A. Because of the shape of our pitot tube, gases will flow through the opening 21 between the legs 12 and 14. The approximately square opening 21 which is most clearly seen in FIG. 4 preferably has a width and a depth which are at least three times as large as the maximum diameter of the input assembly 26. We have made a pitot tube in which the maximum diameter of input assembly 26 is 0.5 inches (1.3 cm), the width between conduit legs 12 and 14 is 1.5 inches (3.8 cm), and the depth of the opening is 1.5 inches (3.8 cm). When the opening is at least three times as large as the maximum diameter of the input assembly there will be no significant obstruction to the flow of gases to the pressure ports in the input assembly. Moreover, the contoured shape of the input assembly 26 reduces drag.

Figure 3:
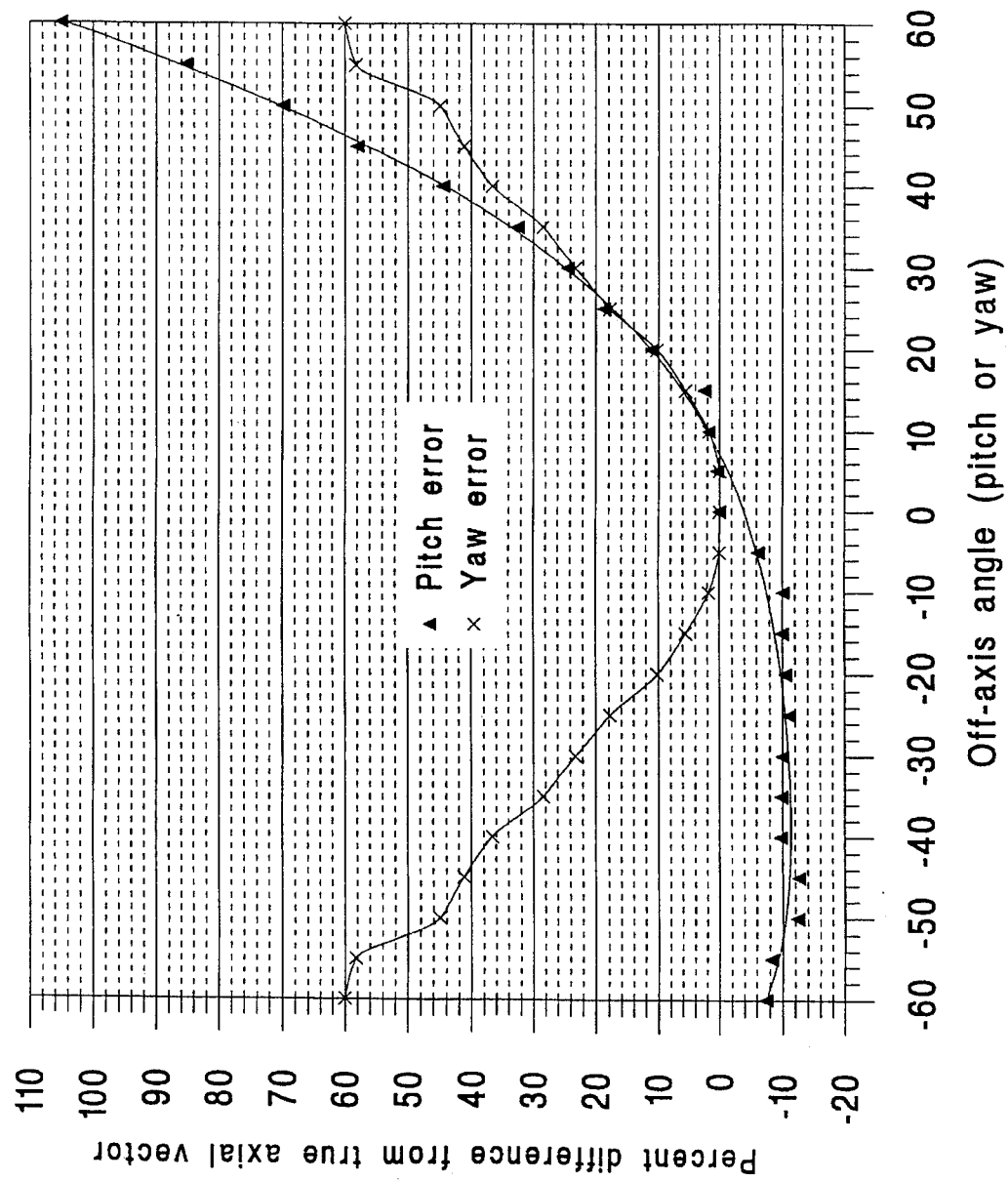
FIG. 3 is a graph showing error from off-axis flow in a Type S pitot tube of the prior art.

Our figures show a Type S, or reverse-type pitot tube which responds to positive/negative pitch angles in the symmetric, positive-biased manner that was previously attained by the prior designs positive/negative yaw angles. This is accomplished via the method of routing the tubes leading to the pitot openings to the right and left of the pitot openings, thereby eliminating aerodynamic interference from the positive/negative pitch axis. The measurement bias due to pitch-angle flow will, in this new design, be similar to the measurement bias shown in on FIG. 3 for yaw-angle flow. Furthermore, because we have created symmetry over the aerodynamically relevant portion of the longitudinal (pitch) dimension, the bias due to pitch will also be symmetric.

Figure 4:
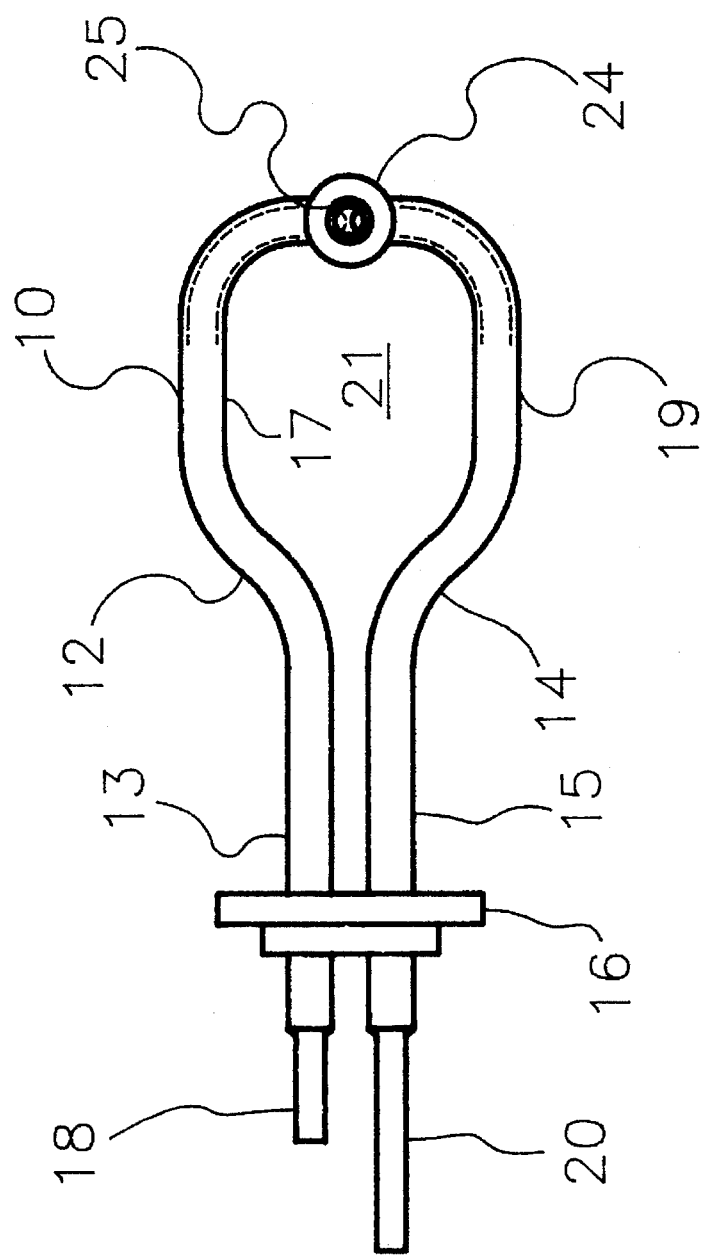
FIG. 4 is a top plan view of a present preferred embodiment of our reverse type pitot tube having enhanced symmetry.
Figure 5:
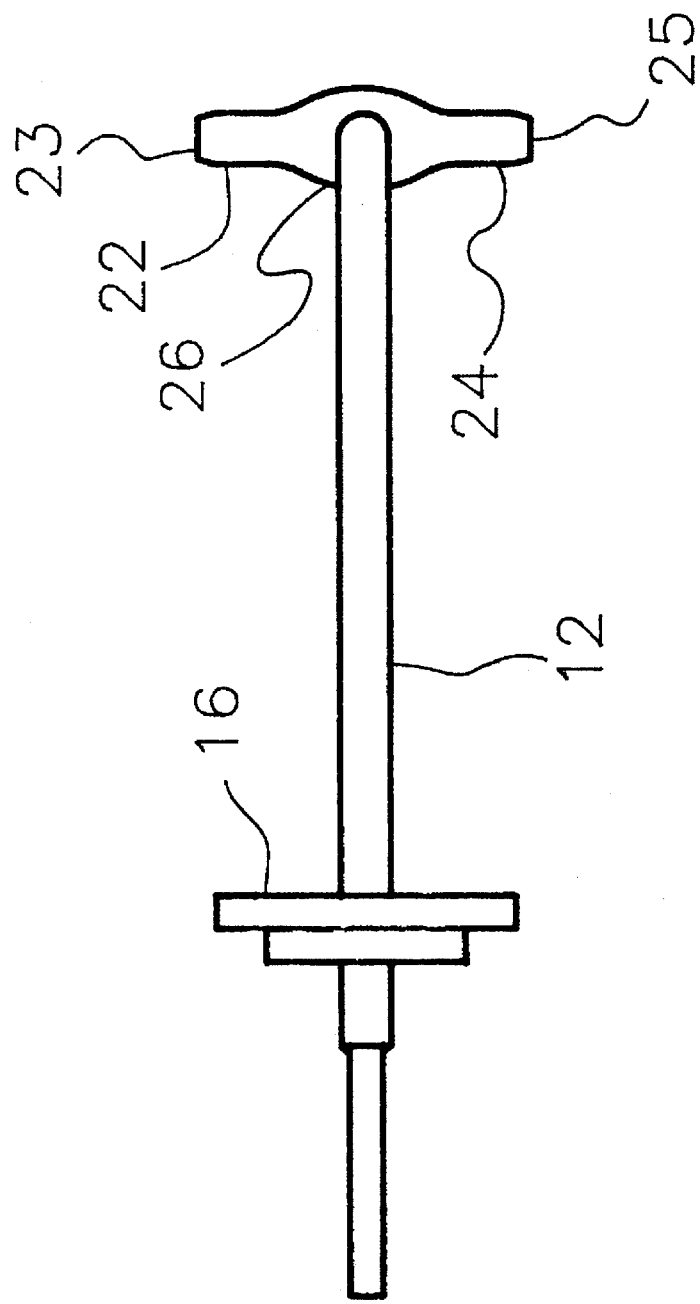
FIG. 5 is a side view of the pitot tube shown in FIGS. 4.
Figure 6:
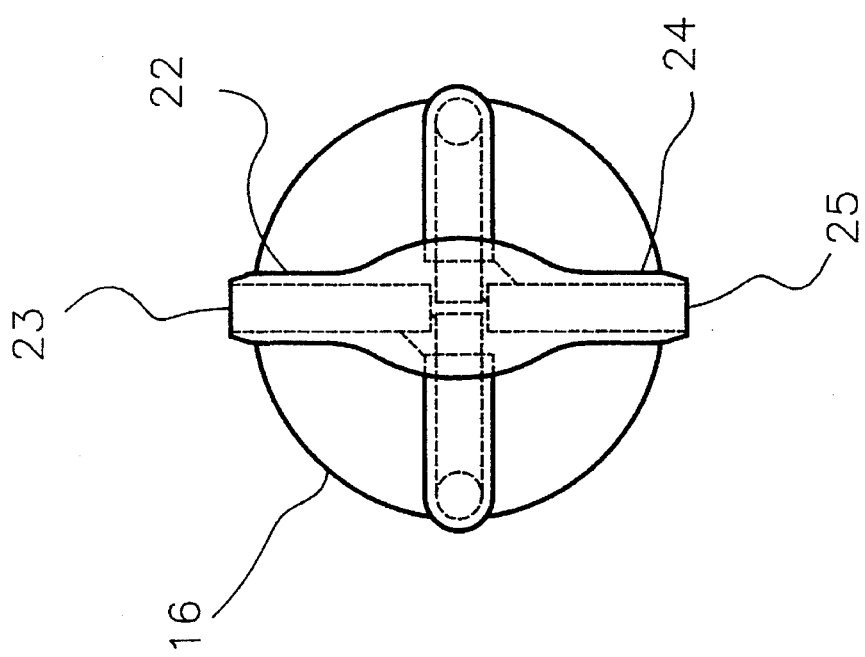
FIG. 6 is an end view of the pitot tube shown in FIGS. 4 and 5.
Figure 7:
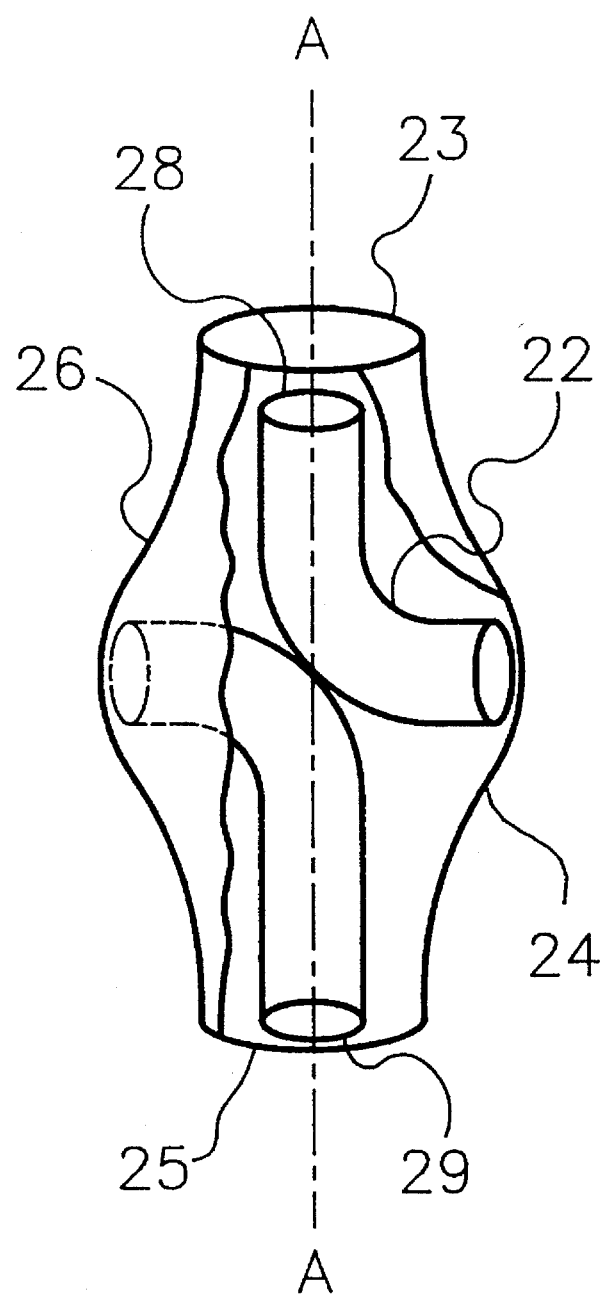
FIG. 7 is a perspective view partially cut away of the input assembly of the embodiment of FIGS. 4 thru 6.

From FIG. 4 it is apparent that, in moving the support tubes to the sides of the pitot openings, we have created a source of aerodynamic interference in the positive/negative yaw dimension. However, due to the symmetric arrangement of this interference, the nulling technique referenced earlier can be utilized to eliminate the effect. That is to say, a pitot tube made via this method can be calibrated and used in a manner such that there is no measurement error due to yaw angle.

Our pitot tube will thereby present no measurement error in the presence of positive/negative yaw flow, and will present only a modest, positively-biased, symmetric bias in the presence of positive/negative pitch flow.

Figure 9:
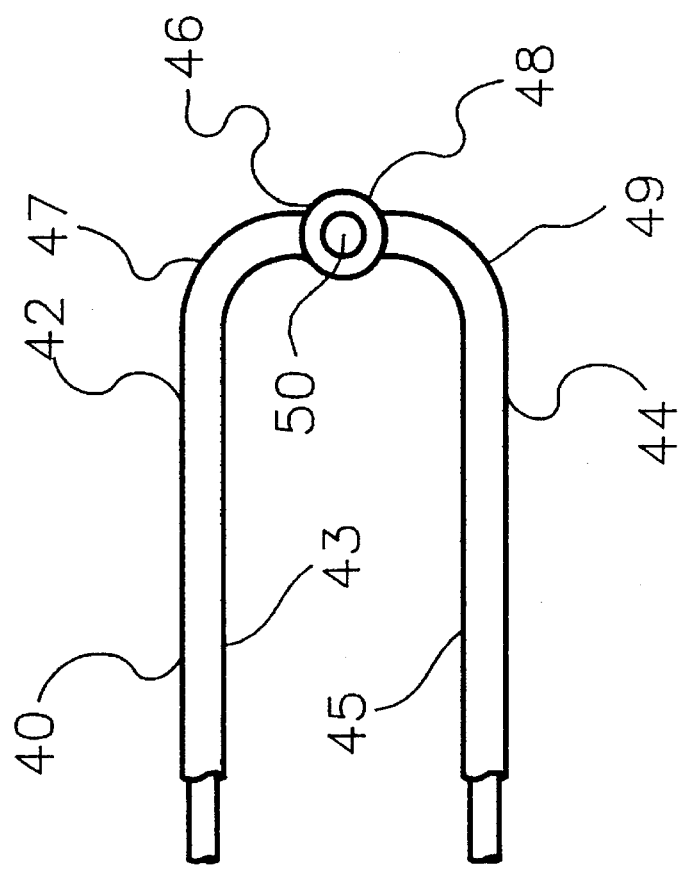
FIG. 9 is a top plan view of a second present preferred embodiment of our reverse type pitot tube having enhanced symmetry.

The shape and construction of our pitot is not limited to the embodiment shown in FIGS. 4 thru 7. In a second preferred embodiment shown in FIG. 9 the pitot tube 40 is comprised of two L-shaped conduit legs 42 and 44 each connected to an input pipe 46 and 48 having a pressure port 50 at its distal end. The pressure ports 50 are collinear on a line A—A which is normal to the plane in which conduit legs 42 and 44 lie. The input pipes are attached in a manner which assures that the conduit legs maintain the orientation and relative position shown in FIG. 9. The proximate ends of tubes 42 and 44 can be connected to the main conduit of a probe assembly 63 such as is shown in FIG. 8. In this embodiment the legs 42 and 44 have a generally straight support portion 43, 45 attached to a connecting portion 47, 49 which extends to input pipe 46 or 48.

We have show the conduit legs in the preferred embodiment as having smoothly curved portions that define a generally rectangular opening. However, our pitot tube is not limited to these shapes. The opening could be oval or circular and defined by arc shaped connecting portions in the conduit legs. Another alternative is to provide sharp right angles in the conduit legs to define a square or rectangular opening.

Our pitot tube can be made from any appropriate corrosion resistant material suitable for use in the intended environment. The conduit legs are preferably stainless steel tubing which has been bent to the desired configuration. The input assembly of the first embodiment can be machined from a block of stainless steel. Nickel chromium corrosion resistant alloys such as those sold under the trademarks "Hastelloy" and "Inconel" may also be used.

Although we have shown and described certain present preferred embodiments of our Type S or reverse type pitot tube as well as the methods for making and using them it is to be distinctly understood that our invention is not limited thereto but may be variously embodied within the scope of the following claims.

We claim:

1. A reverse type pitot tube comprising:
    a. first conduit leg comprised of an input portion having a pressure port therein, a support portion and a connecting portion between the input portion and the support portion, the support portion and the connecting portion laying in one plane which plane is substantially perpendicular to a centerline through the input portion;
    b. a second conduit leg comprised of a second input portion having a pressure port therein, a second support portion and a second connecting portion between the second input portion and the second support portion, the second support portion and the second connecting portion laying in the one plane which plane is substantially perpendicular to a centerline through the second input portion, and the second conduit having a shape which is substantially a mirror image of the first conduit leg; and
    c. a connector attached to the first conduit leg and to the second conduit leg in a manner so that the first and second conduit legs are shaped and oriented relative to one another so that the pressure ports of the input portions of the first and second conduits are collinear and when placed in a conduit, the pitot tube will be symmetrical in a yaw plane and both symmetrical and non-interfering in a pitch plane and the first and second conduits are spaced apart over at least a portion of their length to define an opening adjacent the input portions which opening is at least 3 times wider and deeper than the input portions.

2. The pitot tube of claim 1 wherein the connecting portions of the conduit legs are generally U-shaped.

3. The pitot tube of claim 1 wherein the conduit legs are stainless steel.

4. The pitot tube of claim 1 wherein the input portions of each of the first and second conduit legs have a distal end and are shaped to have an outer diameter which increases from a point at a selected distance from each distal end to a second point which is at a greater distance from each distal end.

5. A reverse type pitot tube comprising:
   a. a symmetrical input assembly containing therein;
      i. a first conduit having an attachment end and a pressure port at an opposite end, and
      ii. a second conduit having an attachment end and a pressure port at an opposite end, wherein the pressure ports are collinear;
   b. a first conduit leg comprised of a first support portion and a first connecting portion connected between the attachment end of the first conduit of the input assembly and the first support portion, the first support portion and the first connecting portion laying in one plane which plane is substantially perpendicular to a line through the pressure ports of the input assembly; and
   c. a second conduit leg comprised of a second support portion and a second connecting portion connected between the second conduit of the input assembly and the second support portion, the second support portion and the second connecting portion laying in the one plane; wherein the first and second conduit legs are shaped and oriented relative to one another so that the pitot tube will be symmetrical in a yaw plane and both symmetrical and non-interfering in a pitch plane and the first and second conduits are spaced apart over at least a portion of their length to define an opening adjacent the input portions which opening is at least 3 times wider and deeper than the input assembly.

6. The pitot tube of claim 5 wherein the conduit legs and input assembly are stainless steel.

7. The pitot tube of claim 5 wherein the input assembly is shaped to have an outer diameter which increases from a point at a selected distance from each distal end to a second point which is at a greater distance from each distal end.

8. A method for measuring at a measurement point within a conduit flow of a fluid flowing in a known nominal direction through the conduit to provide a measurement that is independent of yaw angle flow and which is in most cases affected negligibly by either positive or negative pitch flow or will have positive measurement bias comprising the steps of:
   a. placing an improved reverse type pitot tube at the measurement point the improved reverse type pitot tube comprising:
      i. first conduit leg comprised of an input portion having a pressure port therein, a support portion and a connecting portion connected between the input portion and the support portion, the support portion and the connecting portion laying in one plane which plane is substantially perpendicular to a centerline through the input portion;
      ii. a second conduit leg comprised of a second input portion having a pressure port therein, a second support portion and a second connecting portion connected between the second input portion and the second support portion, the second support portion and the second connecting portion laying in the one plane which plane is substantially perpendicular to a centerline through the second input portion, and the second conduit having a shape which is a mirror image of the first conduit leg; and
      iii. a connector attached to the first conduit leg and to the second conduit leg in a manner so that the first and second conduit legs are shaped and oriented relative to one another so that the pressure ports of the input portions of the first and second conduits are collinear and when placed in a conduit, the pitot tube will be symmetrical in a yaw plane and both symmetrical and non-interfering in a pitch plane and the first and second conduits are spaced apart over at least a portion of their length to define an opening adjacent the input portions which opening is at least 3 times wider and deeper than the input portions;
   b. orienting the improved S-type pitot tube along a selected axis through the conduit;
   c. finding a null position;
   d. assigning a direction 90° from the null position toward the nominal flow direction as the true flow direction;
   e. rotating the S-type pitot tube 90°;
   f. taking at least one differential pressure reading;
   g. utilizing the at least one differential pressure reading to determine flow velocity with the pitot tube aligned with the yaw angle; and
   h. multiplying the determined flow velocity by a cosine of the yaw angle to determine axial velocity.

9. The method of claim 8 also comprising the step of utilizing the axial flow velocity to determine flow rate of the fluid in the nominal direction.

10. The method of claim 9 also comprising the steps of determining a flow rate of the fluid in the nominal direction of at least one other measurement point and averaging all such flow rates from the measurement points to determine a total flow rate of fluid through the conduit.

11. A method for measuring at a measurement point within a conduit flow of a fluid flowing in a known nominal direction through the conduit to provide a measurement that is independent of yaw angle flow and which is in most cases affected negligibly by either positive or negative pitch flow or will have positive measurement bias comprising the steps of:
   a. placing an improved reverse type pitot tube at the measurement point the improved reverse type pitot tube comprising:
      i. a symmetrical input assembly containing therein a first conduit having an attachment end and a pressure port at an opposite end, and a second conduit having an attachment end and a pressure port at an opposite end, wherein the pressure ports are collinear;
      ii. a first conduit leg comprised of a first support portion and a first connecting portion connected between the attachment end of the first conduit of the input assembly and the first support portion, the first support portion and the first connecting portion laying in one plane which plane is substantially perpendicular to a line through the pressure ports of the input assembly; and
      iii. a second conduit leg comprised of a second support portion and a second connecting portion connected between the second conduit of the input assembly and the second support portion, the second support portion and the second connecting portion laying in the one plane; wherein the first and second conduit legs are shaped and oriented relative to one another so that the pitot tube will be symmetrical in a yaw plane and both symmetrical and non-interfering in a pitch plane and the first and second conduits are spaced apart over at least a portion of their length to define an opening adjacent the input portions which opening is at least 3 times wider and deeper than the input assembly;

b. orienting the improved S-type pitot tube along a selected axis through the conduit;

c. finding a null position;

d. assigning a direction 90° from the null position toward the nominal flow direction as the true flow direction;

e. rotating the S-type pitot tube 90°;

f. taking at least one differential pressure reading;

g. utilizing the at least one differential pressure reading to determine flow velocity with the pitot tube aligned with the yaw angle; and h. multiplying the determined flow velocity by a cosine of the yaw angle to determine axial velocity.

12. The method of claim 11 also comprising the step of utilizing the axial flow velocity to determine flow rate of the fluid in the nominal direction.

13. The method of claim 12 also comprising the steps of determining a flow rate of the fluid in the nominal direction of at least one other measurement point and averaging all such flow rates from the measurement points to determine a total flow rate of fluid through the conduit.

14. A method of making an improved reverse type pitot tube comprising the steps of a. forming a first conduit leg comprised of an input portion having a pressure port therein, a support portion and a connecting portion connected between the input portion and the support portion, the support portion and the connecting portion laying in one plane which plane is substantially perpendicular to a centerline through the input portion;

b. forming a second conduit leg comprised of a second input portion having a pressure port therein, a second support portion and a second connecting portion connected between the second input portion and the second support portion, the second support portion and the second connecting portion laying in the one plane which plane is substantially perpendicular to a centerline through the second input portion, and the second conduit having a shape which is a mirror image of the first conduit leg; and c. connecting the first conduit leg to the second conduit leg in a manner so that the first and second conduit legs are shaped and oriented relative to one another so that the pressure ports of the input portions of the first and second conduits are collinear and when placed in a conduit, the pitot tube will be symmetrical in a yaw plane and both symmetrical and non-interfering in a pitch plane and the first and second conduits are spaced apart over at least a portion of their length to define an opening adjacent the input portions which opening is wider than the input portions.

\* \* \* \* \*